Patented Sept. 13, 1932

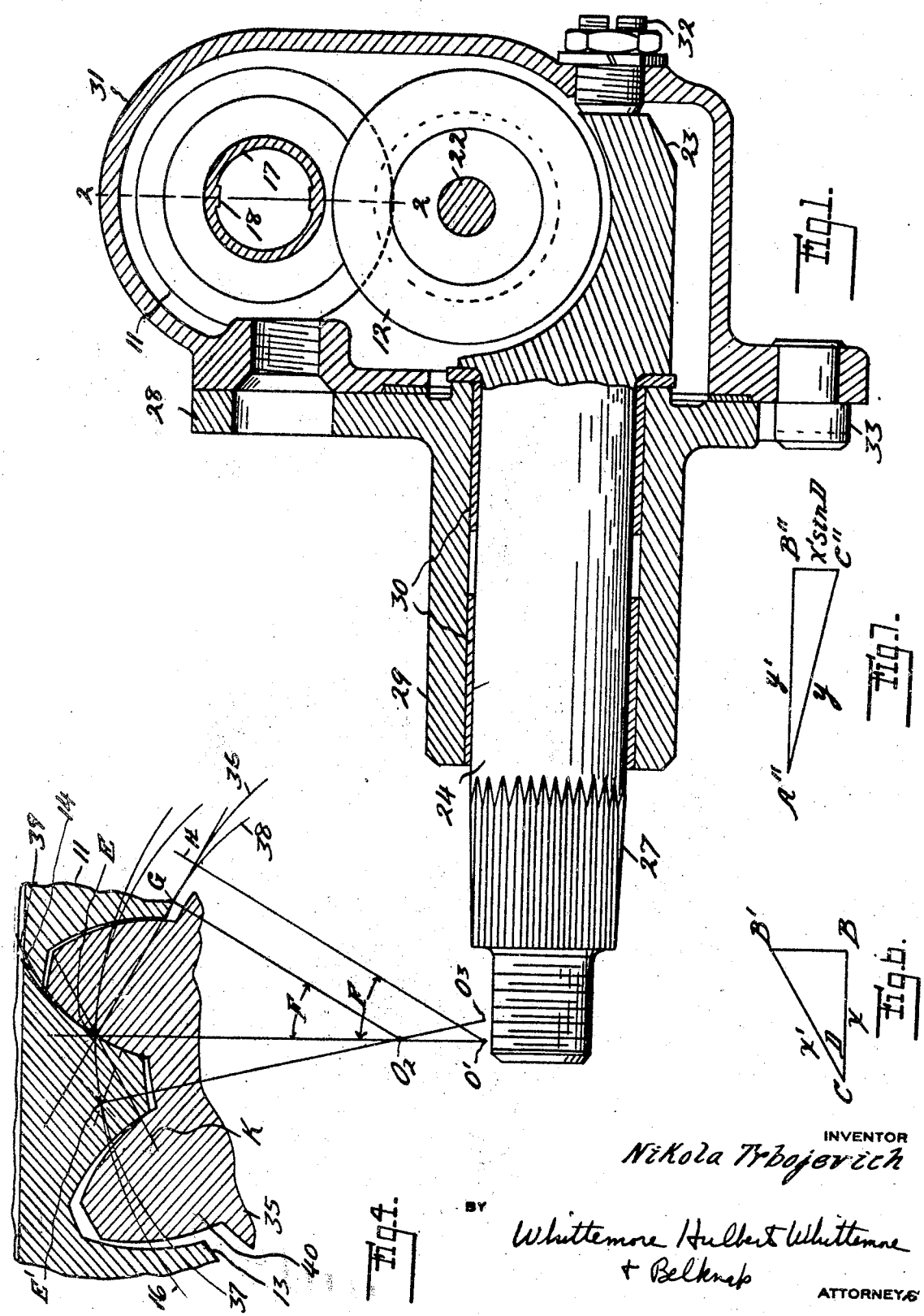

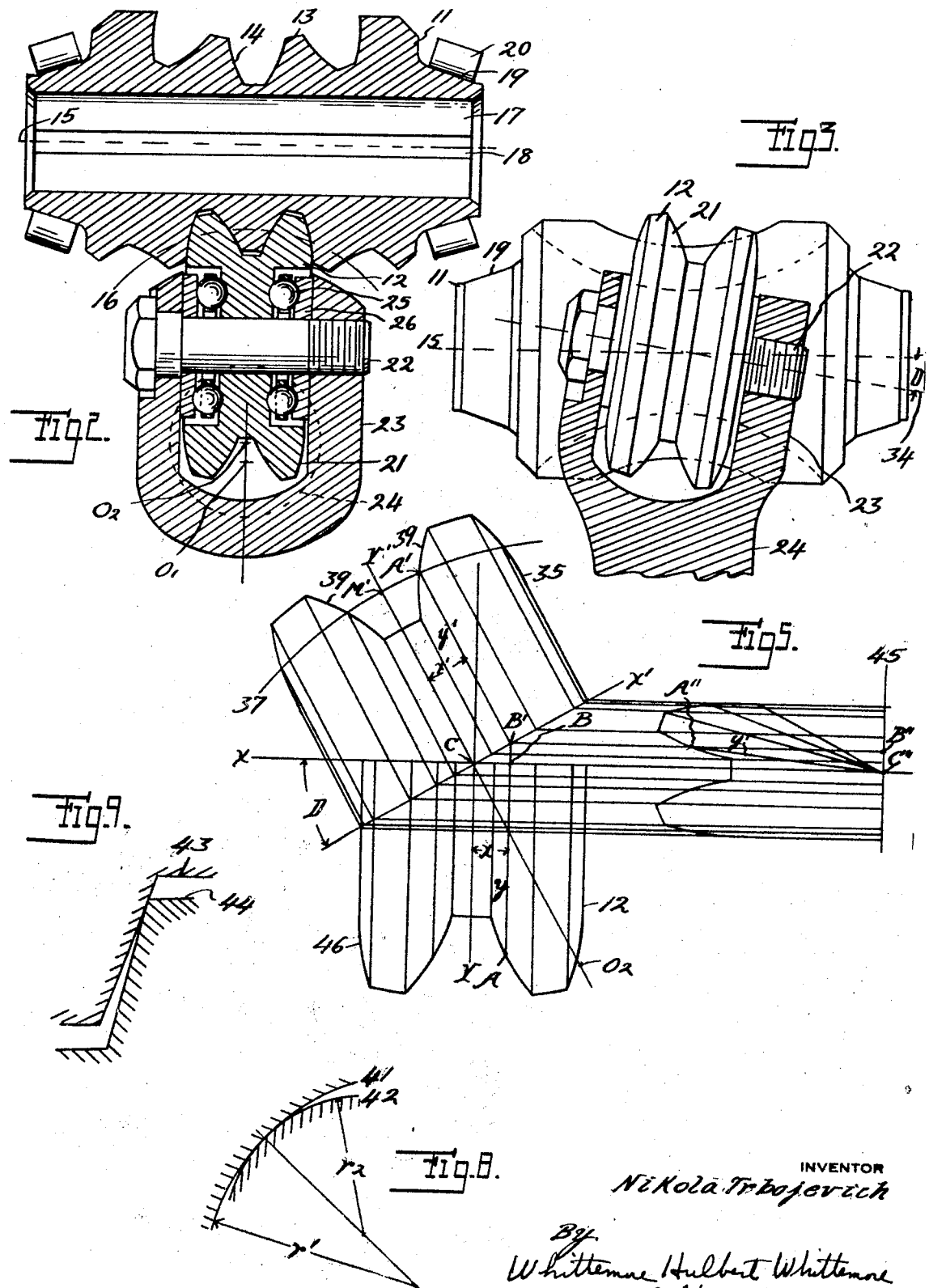

1,876,795

UNITED STATES PATENT OFFICE

NIKOLA TRBOJEVICH, OF DETROIT, MICHIGAN

STEERING GEAR

Application filed April 28, 1930. Serial No. 448,066.

The invention relates to an improvement in steering gears of the worm and roller type and more particularly to the novel formation of tooth curves in the worm and roller.

Heretofore such mechanisms were made on the Hindley principle in that the globoid worm had straight line axial thread contours and the roller had also straight line contours. However, I discovered that such a mechanism was susceptible to an edge contact in the case of a slight misalignment or drifting of the members and was therefore difficult to manufacture and adjust on account of the extreme accuracy required.

One of the objects of this invention is to construct a steering gear in which the useful swing of the sector and the load-bearing ability of the gear is substantially increased.

Another object is to insure a tangential contact of the mating surfaces within a range of the axial and radial displacements of the worm and thereby to prevent the formation of an edge contact.

Still another object is to construct a roller, the contours of which are progressively corrected in the axial plane as hereinafter more fully explained. Another object is to provide a mechanism in which the roller will have an increased backlash at the two ends of its swing and yet will correctly mesh with the globoid worm.

A further object is to construct a mechanism in which the axial contours of the worm threads are concave and the lines of pressure are all convergent thereby increasing its shock-resisting ability.

The globoid worm utilized in this gearing is characterized by the formation of its axial thread cross contours which are concave at both sides of the thread. A worm of this type was first shown in my United States Patent No. 1,790,607, issued January 27, 1931.

In the drawings

Figure 1 is the cross section of the steering gear taken in the gorge plane of the worm;

Figure 2 is a cross section taken in the plane 2—2 Figure 1;

Figure 3 is a side view of Figure 2;

Figure 4 shows the mating curves in Figure 2 in an enlarged and exaggerated scale explanatory of the principles involved;

Figures 5, 6 and 7 are geometrical diagrams showing the method of determining the meridian curves of the roller from the conjugate profile obtained in Figure 4;

Figure 8 is a diagram showing the nature of contact in my improved gear;

Figure 9 shows an edge contact which it is desired to avoid in the new gear.

As is seen from Figure 2, the principal members of the new steering gear are the worm 11 and the roller 12. The worm 11 possesses a plurality of spiral thread convolutions 13 formed preferably in a single helix or start in the manner of globoids, i. e. a generating tool is rotated about the axis O' and the worm is rotated in unison therewith, thus producing the curved thread flanks 14 and a plurality of equispaced teeth 13 in the meridian circle 16. The worm 11 is provided with a broached hole 17 having a plurality of shallow splines 18 in which the steering tube may be pressed. The rollers 20 are capable of rolling over two conical races 19 formed at the two ends of the worm shell.

The steering roller 12 has preferably two teeth 21 (although designs having a greater or less number of teeth may also be constructed in accordance with this invention) and is rotatable upon the stud 22 spanning the U-shaped yoke 23 built integral with the steering shank 24. The end thrust, which in this mechanism is the principal stress, is taken up by two rows of balls 25 in the races 26.

The mounting of the sector as seen from Figure 1 is of a conventional design and will therefore be only briefly described. The shank 24 is serrated at its one end 27 and is formed in a yoke 23 at its other end. The side plate 28 has a bearing 29 integrally formed therewith in which the bronze bushings 30 are inserted. The worm carrier 31 in which the worm 11 is rotatable contains a means for axially adjusting the sector in the form of the adjusting screw 32 and also contains an eccentric bolt 33 by means of which the backlash may be taken up in the approved manner.

Figure 3 shows the roller 12 superposed over the worm 11. The angle D which the axis 34 of the roller includes with the axis 15 of the worm corresponds to the helical angle of the worm. The angle D should be carefully and experimentally determined as upon its selection some vital characteristics of the steering gear will depend. If the angle D should be selected too great the gear will be reversible and will chatter in the hands of the operator and if the said angle should be chosen too small, the gear will be needlessly inefficient. About 5 to 7 degrees will be found suitable for most practical purposes.

The kinematics of this mechanism will now be discussed. The problem to be solved consists in three parts, viz. 1, the determination of the tooth curves of the worm; 2, the tooth curves of an imaginary conjugate member 35, Figure 4; and 3, the final tooth curves of the roller as derived from the said member.

In Figure 4, the meridian circle 16 of the globoid is struck from the center O′ and if the point E be selected as the pitch point of the system, the line E G H tangent to the base circle 36 will be the line of action or pressure, thus producing a pressure angle F. The imaginary mating member 35 has a pitch circle 37 tangent to the circle 16 at E, a center at $O_2$ and a base circle 38 tangent to the line of action at G. Two sets of involutes are now constructed, the concave flanks 14 from the base circle 36 and the convex flanks 39 from the circle 38. From this it follows, first that the concave flanks possess at every possible point of contact a greater radius of curvature than the mating convex flanks, second that the meridian circle 16 similarly hugs outwardly the pitch circle 37 and third, that the two mating curves are odontically conjugate in that both are capable of meshing with the same basic rack and will therefore roll together at a constant ratio of transmission according to the laws of gearing.

The practical advantages issuing from this will also be readily appreciated. The radius of curvature of the involute 14 at the point E is equal to EH and that of the involute 39 is equal to EG thus giving a balance of GH in the favor of the concave curve. This balance GH is, further, constant for all possible points of engagement as long as the distance $O_2$ O′ remains constant. Upon spreading or contracting the distance $O_2$ O′ the distance GH will also correspondingly increase or decrease but the tangency between the mating curves will not be lost. Thus, the distance GH may be considered as a measure of a manufacturing tolerance inherent in this type.

A further benefit consists in the fact that the worm may be slightly rocked in its axial plane without particularly ill results following. Thus, imagine that the right-hand side of the worm 11, Figure 4, is raised slightly so that the pitch point E will drift to the left in the new position E′. This will cause the meridian center O′ to drift to the right in the new position $O_3$. It is seen that the meshing conditions will remain the same as formerly in all respects except that the bearing will not be symmetrical about the gorge plane of the worm as formerly but will be concentrated toward the left side of the worm.

Still another benefit follows from the fact that the center of rotation of the sector $O_2$ is eccentric relative to the meridian circle 16 which fact provides less backlash when the roller engages the middle or gorge position of the worm and more backlash at the two ends of the worm. This meets the requirements expected from a good steering gear, namely, that in straight driving (when the roller is in the middle of the worm) the gear should be tight in order to prevent the chattering caused by the road wheel shocks, but when the steering wheel is rotated out of its central or neutral position the tight fit should be automatically released in order that the roller may roll freely and the mechanism may be operated with less labor. The above advantage in this construction is the most pronounced when the roller 12 is made to have one tooth only, but in multiple tooth rollers I obtain substantially the same effect by making the central tooth or portion of the roller very slightly oversize so that the heaviest bearing will be obtained when the middle part of the roller engages the middle part of the worm.

It remains now to determine a suitable ratio to exist between the radii $EO_2$ and EO′ respectively. In view of the fact that the rollers in this steering gear construction are not necessarily generated in the manner of gearing but may be ground by form grinding or otherwise formed, they may be designed to have a fractional number of teeth in the completed pitch circle. This fact enables me to cut down the distance $O_2O′$ from its former more or less fixed value to any other value that may be desired in each particular instance.

In meshing concave and convex surfaces, Figure 8, the stress produced in the surfaces is proportional to the so-called Hertz factor, the value of which is $$\frac{1}{r_2} - \frac{1}{r'} = \frac{r' - r_2}{r' r_2} \quad (1)$$

where $r'$ is the radius of the concave face 41 and $r_2$ is the radius of the convex face 42. Inasmuch as the value of $r' - r_2 = GH$, Figure 4, it follows that other things being equal the stress is directly proportional to the distance GH in the new gear.

The Hertz factor also indicates the danger that may arise from an edge contact between the teeth 43 and 44 such as is illustrated in Figure 9. When from the identity 1 either $r'$ or $r_2$ is equal to zero (an edge is supposed to have a zero radius of curvature) the stress becomes infinite. Thus in selecting the eccentricity $O' O_2$, Figure 4, said selection should liberally cover the predictable manufacturing and assembling errors and an edge contact should be prevented by all means.

In designing the members 11 and 35, Figure 4, one proceeds as if the members were ordinary helical gears as explained in my United States Patent No. 1,790,608, issued January 27, 1931.

The design of the roller 12 from the imaginary element 35, Figure 4, is shown in Figure 5. Said element 35 represents the cross section of the roller taken in the axial plane of the worm and in order to arrive at the corresponding section of the roller in its own axial plane a correction must be made. This can be done graphically or by calculation, or mechanically.

In the graphical method the member 35 having the tooth curves 39 is laid out from the center $O_2$ to be at an appropriate distance, said distance corresponding to the selected pitch radius $CM'$ of the roller, from the axis $X'$. The other axis $Y'$ crosses the axis $X'$ at the center $C$ of the roller. At the (helix) angle $D$ with respect to the axis $X'$ another pair of orthogonal axes $X$ and $Y$ are drawn having the same origin at $C$. A line 45 is drawn at a convenient distance parallel to $Y$. The roller curves 46 may now be plotted from the curves 39 by projecting and scaling only. To determine the point $A$ of the curve 46 from $A'$ of the curve 39 one drops a perpendicular $A'B'$ upon $X'$ and the perpendiculars $B'A$ upon $X$ and $B'B''$ upon the line 45, equates the distance $A'B' = A''B''$, from the triangle $A''B''C''$ at the right-hand side one scales off the hypothenuse $A''C''$ and equates it at $BA$ thus finding the point $A$.

The same transformation may also be effected mathematically. Let the coordinates of the point $A'$ in the system $X'Y'$ be denoted with $x'y'$ and those of the point $A$ in the system $XY$ with $xy$. Then from the triangles in Figures 6 and 7 we have $$x = x' \cos D \qquad (2)$$

$$y^2 = y'^2 + x'^2 \sin^2 D \qquad (3)$$

showing that the amount of modification increases with the angle $D$ and the width of the roller, and decreases when the diameter of the roller is increased.

Equations 2 and 3 suggest a somewhat simpler modification of the above explained graphic method, because, by squaring the equation 2 and by adding it to the equation 3 and remembering that $$\cos^2 D + \sin^2 D = 1 \qquad (4)$$

we have $$x^2 + y^2 = x'^2 + y'^2 \qquad (5)$$

consequently, $$CA = CA' \qquad (6)$$

that is, any two corresponding points $A'$ and $A$ of the curves 39 and 46 lie in a circle drawn from the center $C$.

What I claim as my invention is:

1. In a steering gear of the worm and roller type, a roller comprising a plurality of rotary contact surfaces drawn about an axis in which the intersection of the said surfaces with an oblique plane passing through the center of the roller are a series of convex curves all lying in a circle and all conjugate to a basic rack from which the worm thread contours were developed.

2. In a steering gear of the worm and roller type, a roller comprising a plurality of rotary contact surfaces drawn about an axis in which the intersections of the said surfaces with an oblique plane intersecting the axis of the roller at a predetermined helix angle are a series of involutes drawn from a base circle eccentric relative to the center of the roller.

3. In a steering gear of the worm and roller type, a roller comprising a plurality of disk-shaped rotary teeth concentric about an axis in which the said teeth are evenly spaced in a circle in a plane intersecting the roller axis at an acute angle and in which the tooth curves in the said plane are all similar, convex and of a variable radius of curvature from tips to roots thereof.

4. In a steering gear of the worm and roller type, a roller comprising a plurality of concentric rotary contact surfaces in which the intersections of the said surfaces with a plane intersecting the axis of the roller at a predetermined acute angle are a series of similar curves arranged in a circle eccentric relative to the center of the roller.

In testimony whereof I affix my signature.

NIKOLA TRBOJEVICH.